(12) United States Patent
Deve et al.

(10) Patent No.: US 7,547,843 B2
(45) Date of Patent: Jun. 16, 2009

(54) OVERHEAD ELECTRICAL POWER TRANSMISSION LINE

(75) Inventors: Herve E. Deve, Minneapolis, MN (US); Douglas E. Johnson, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 319 days.

(21) Appl. No.: 11/617,461

(22) Filed: Dec. 28, 2006

(65) Prior Publication Data
US 2008/0156525 A1 Jul. 3, 2008

(51) Int. Cl.
*H02G 7/14* (2006.01)
(52) U.S. Cl. .................. 174/40 R; 174/43; 174/45 R
(58) Field of Classification Search ........... 174/40 R, 174/40 TD, 41, 42, 43, 45 R, 45 TD
See application file for complete search history.

(56) References Cited

U.S. PATENT DOCUMENTS

| | | | |
|---|---|---|---|
| 2,790,843 A * | 4/1957 | Gordon | 174/42 |
| 2,831,048 A * | 4/1958 | Weaver | 174/42 |
| 3,234,319 A * | 2/1966 | Gill | 174/43 |
| 3,676,578 A * | 7/1972 | Cahill | 174/128.1 |
| 3,709,706 A | 1/1973 | Sowman | |
| 3,795,524 A | 3/1974 | Sowman | |
| 4,047,965 A | 9/1977 | Karst et al. | |
| 4,346,255 A | 8/1982 | Nigol | |
| 4,362,352 A * | 12/1982 | Hawkins et al. | 439/788 |
| 4,686,325 A | 8/1987 | Marsico et al. | |
| 4,954,462 A | 9/1990 | Wood et al. | |
| 5,171,942 A | 12/1992 | Powers | |
| 5,185,299 A | 2/1993 | Wood et al. | |
| 5,501,906 A | 3/1996 | Deve | |
| 5,554,826 A | 9/1996 | Gentry | |
| 5,689,417 A | 11/1997 | Shockley et al. | |
| 5,789,701 A * | 8/1998 | Wettengel et al. | 174/41 |
| 6,127,625 A | 10/2000 | Castano | |
| 6,180,232 B1 | 1/2001 | McCullough et al. | |
| 6,191,354 B1 | 2/2001 | Castano et al. | |
| 6,245,425 B1 | 6/2001 | McCullough et al. | |
| 6,329,056 B1 | 12/2001 | Deve et al. | |
| 6,336,495 B1 | 1/2002 | McCullough et al. | |
| 6,344,270 B1 | 2/2002 | McCullough et al. | |

(Continued)

FOREIGN PATENT DOCUMENTS

JP 2002-199569 7/2002

(Continued)

OTHER PUBLICATIONS

"HTLS Conductors: Reliability and Cost," A Proposal in Response to Funding Opportunity No. DE-PS02-05CH11270 to The U.S. Department of Energy, 3M Company, Jul. 2005, pp. 1-22.

(Continued)

*Primary Examiner*—William H Mayo, III
(74) *Attorney, Agent, or Firm*—Gregory D. Allen; James A. Baker (57) ABSTRACT

Dead-end-to-dead-end overhead electrical power transmission line with composite (e.g., aluminum matrix composite) core overhead electrical power transmission conductor tension subsection and another, different core overhead electrical power transmission conductor tension subsection.

17 Claims, 5 Drawing Sheets

U.S. PATENT DOCUMENTS

| | | |
|---|---|---|
| 6,447,927 B1 | 9/2002 | McCullough et al. |
| 6,460,597 B1 | 10/2002 | McCullough et al. |
| 6,485,796 B1 | 11/2002 | Carpenter et al. |
| 6,523,424 B1* | 2/2003 | Hayes et al. ............ 73/862.391 |
| 6,544,645 B1 | 4/2003 | McCullough et al. |
| 6,559,385 B1 | 5/2003 | Johnson et al. |
| 6,692,842 B2 | 2/2004 | McCullough et al. |
| 6,723,451 B1 | 4/2004 | McCullough et al. |
| 6,796,365 B1 | 9/2004 | McCullough et al. |
| 6,913,838 B2 | 7/2005 | McCullough et al. |
| 7,093,416 B2 | 8/2006 | Johnson et al. |
| 7,131,308 B2 | 11/2006 | McCullough et al. |
| 2005/0181228 A1 | 8/2005 | McCullough et al. |
| 2006/0102377 A1 | 5/2006 | Johnson et al. |
| 2006/0102378 A1 | 5/2006 | Johnson et al. |
| 2007/0009224 A1* | 1/2007 | Browning ................... 385/147 |

FOREIGN PATENT DOCUMENTS

| | | |
|---|---|---|
| JP | 2006-333651 | 12/2006 |

OTHER PUBLICATIONS

U.S. Patent Application entitled "Ultrasonic Energy System and Method Including a Ceramic Horn," filed on Mar. 31, 2003, having U.S. Appl. No. 10/403,643.

U.S. Patent Application entitled "Ceramic Oxide Fibers," filed on Dec. 28, 2006, having U.S. Appl. No. 11/616,963.

U.S. Patent Application entitled "Installation of Spliced Electrical Transmission Cables," filed on Mar. 7, 2006, having U.S. Appl. No. 11/276,607.

U.S. Patent Application entitled "Method for Selecting Conductors of an Overhead Power Transmission Line," filed on Dec. 28, 2006, having U.S. Appl. No. 11/617,480.

U.S. Patent Application entitled "Overhead Electrical Power Transmission Line," filed on Dec. 28, 2006, having U.S. Appl. No. 11/617,494.

U.S. Patent Application entitled "Overhead Power Transmission Line Conductor Selection," filed on May 19, 2006, having U.S. Appl. No. 11/419,365.

Transmission and Distribution Committtee, of the IEEE Power Engineering Society, "IEEE Standard for Calculating the Current-Temperature Relationship of Bare Overhead Conductors", Institute of Electrical and Electronics Engineers standard # 738, 1993, Calculation Module 23, IEEE Corporate Office.

Thrash et al, "Overhead Conductor Manual", Southwire Company Overhead Conductor Manual, First Edition 1994.

"A Method of Stress-Strain Testing of Aluminum Conductors and ACSR and A Method for Determining the Long Time Creep of Aluminum Conductors in Overhead Line", Aluminum Association Guide, Rev. 1999.

Kelly, D. K. and Jancauskas, J. R.; "Cable Sizing—Avoid Shortcuts and Do It Right", IEEE, 1996, pp. 2341-2346.

Kirshnasamy, S. G., Ford, G. L., and Orde, C. I.; "Predicting the Structural Performance of Transmission Lines Uprated by Reconductoring", IEEE Transactions on Power Apparatus and Systems, vol. PAS-100, No. 5, May 1981, pp. 2271-2277.

Chen, S.L., Black, W. Z., Loard, H. W. Jr.; "High Temperature Ampacity Model for Overhead Conductors", IEEE Transactions on Power Delivery, vol. 17, No. 4, Oct. 2002, pp. 1136-1141.

Chen, S.L., Black, W. Z., Loard, H. W. Jr.; "Closure on High Temperature Ampacity Model for Overhead Conductors", IEEE Transaction on Power Delivery, vol. 18, No. 2, Apr. 2003, pp. 647.

Chen, S.L., Black, W. Z., Fancher, M. L.; "High Temperature Sag Model for Overhead Conductors", IEEE Transaction on Power Delivery, vol. 18, No. 1, Jan. 2003, pp. 183-188.

Chen, S.L., Black, W. Z., Fancher, M. L.; "Closure on 'High Temperature Sag Model for Overhead Conductors'", IEEE Transaction on Power Delivery, vol. 18, No. 4, Oct. 2003. pp. 1600-1601.

Filipovic-Gledja, V., Morgan, V. T., and Findlay, R. D.; "A Unified Model for Predicting the Electrical, Mechanical and Thermal Characteristics of Stranded Overhead-Line Conductors", Department of Electrical and Computer Engineering, McMaster University, Hamilton, Ontario, Canada, pp. 182-185.

Morgan, V. T.; Discussion of "High Temperature Ampacity Model for Overhead Conductors", IEEE Transactions on Power Delivery, vol. 18, No. 2, Apr. 2003, pp. 646-647.

Morgan, V. T., Discussion of "High Temperature Sag Model for Overhead Conductors", IEEE Transaction on Power Delivery, vol. 18, No. 4, Oct. 2003. pp. 1600.

Peyrot, A. H.; "Microcomputer-Based Nonlinear Structural Analysis of Transmission Line Systems", IEEE Transactions on Power Apparatus and Systems, vol. PAS-104, No. 11, Nov. 1985, pp. 3236-3244.

Ringler, P.; "Automated Methods of Power-Line Design/Analysis", Transmission & Distribution, Oct. 1990, pp. 70-73.

Rodolakis, A. J.; "Point-and-Click Cable Ampacity Studies", IEEE, Apr. 1998, pp. 53-56.

PLS-CADD™ (Power Line Systems—Computer Aided Design and Drafting), PowerLine® Systems Inc., <http://www.powline.com/products/pls_cadd.html>, pp. 1-9 [retrieved from the internet on Mar. 15, 2006].

Pondera Engineers, LLC, "Products, Nip & Tuck, Transmission Line Design and Engineering", <http://www.ponderaengineers.com/products/niptuck.asp>, [retrieved from the internet on Sep. 13, 2006].

Pondera Engineers, LLC, "Products, TLCADD, Transmission Line Design and Engineering", <http://www.ponderaengineers.com/products/tlcadd.asp>, [retrieved from the internet on Sep. 13, 2006].

Pondera Engineers, LLC, "Products, LD-DigiCAD—Transmission Line Design and Engineering", <http://www.ponderaengineers.com/products/ld-digicad.asp>, [retrieved from the internet on Sep. 13, 2006].

Pondera Engineers, LLC, "Products, PoleSTAR—3D Structure Analysis and Design", <http://www.ponderaengineers.com/products/polestar.asp>, [retrieved from the internet on Sep. 13, 2006].

RateKit Thermal Rating ToolKit, "Products, Ratekit Thermal Rating Toolkit, Ratekit Brochure", <http://www.cat-1.com/ratekit.html>, [retrieved from the internet on Sep. 5, 2006].

Ponder Engineers, "Products, TL-Pro Design Studio—Transmission Line Design and Engineering", <http://www.ponderaengineers.com/products/tl-pro_studio.asp>, [retrieved from the internet on Sep. 5, 2006].

* cited by examiner

OVERHEAD ELECTRICAL POWER TRANSMISSION LINE

BACKGROUND

Use of a variety of overhead (electrical) power transmission conductors is known in the art, including those having wires (e.g., aluminum wires, copper wires, aluminum alloy wires, and copper alloy wires) stranded around a core comprising, for example, steel wires or aluminum matrix composite wires (e.g., alpha alumina fibers in an aluminum or aluminum alloy (e.g., up to 2 percent by weight copper)).

Typically, the same overhead electrical power transmission conductor construction is used in a single tension section between dead-end towers, although combinations of constructions may be encountered when a tension section is repaired.

Due to the relatively high or higher cost of many overhead electrical power transmission conductors that are alternatives to the traditional steel-cored overhead electrical power transmission conductors, it is desirable to be able to use the higher cost overhead electrical power transmission conductors in selected areas of a tension section between dead-end towers. In another aspect, it is desirable to be able to have the construction flexibility to use at least two different overhead electrical power transmission conductors in a tension section between dead-end towers.

SUMMARY

In one aspect, the present invention provides a dead-end-to-dead-end overhead electrical power transmission line tension section comprising:

first and second dead-end towers; and an overhead electrical power transmission conductor tension section having a first end attached to the first dead-end tower and a second end attached to the second dead-end tower, and being comprised of at least a first and a second sequential overhead electrical power transmission conductor tension subsection, wherein at least the first sequential overhead electrical power transmission conductor tension subsection has at least one of a composite (e.g., aluminum (including aluminum alloys) and polymeric matrix composites) core or an Invar (i.e., an iron alloy comprising iron, nickel, and optionally other elements such as chromium, titanium, and carbon, wherein the iron alloy has a thermal expansion coefficient that is less than the linear combination of its constituents) core, wherein the first and second overhead electrical power transmission conductor tension subsections each have a sag value, wherein the first overhead electrical power transmission conductor tension subsection has a first coefficient of thermal expansion and a first density, wherein the second overhead electrical power transmission conductor tension subsection has a second coefficient of thermal expansion and a second density, wherein at least one of the first and second coefficients of thermal expansion or the first and second densities, at temperatures in the range from 20° C. to 75° C. (in some embodiments, in a range from 25° C. to 75° C., 20° C. to 100° C., 25° C. to 100° C., 20° C. to 125° C., 25° C. to 125° C., 20° C. to 150° C., 25° C. to 150° C., 20° C. to 175° C., 25° C. to 175° C., 20° C. to 200° C., 25° C. to 200° C., 20° C. to 225° C., 25° C. to 225° C., 20° C. to 240° C., 25° C. to 240° C., 0° C. to 75° C., 0° C. to 100° C., 0° C. to 200° C., 0° C. to 300° C., –40° C. to 100° C., –40° C. to 200° C., or even –40° C. to 300° C.), are different (i.e., the first and second coefficients of thermal expansion, the first and second densities, or collectively, the first and second coefficients of thermal expansion and the first and second densities, are sufficiently different over the specified temperature range to provide a sag difference (i.e., the sag for each overhead electrical power transmission conductor tension subsection is different when each is calculated for the ruling span of the overhead electrical power transmission conductor tension section for a given tension) of at least 2 (in some embodiments, at least 3, 4, 5, 6, 7, 8, 9, 10, 15, 20, 25 or even at least 30) percent), wherein the first and second overhead electrical power transmission conductor tension subsections each have a cross-sectional area, and wherein the cross-sectional areas are the same (i.e., within ±2 percent by area of each other), and wherein the first and second overhead electrical power transmission conductor tension subsections each independently have calculated tensions (i.e., when the tension for each overhead electrical power transmission conductor tension subsection is calculated for the ruling span of the overhead electrical power transmission conductor tension section) over a range from 20° C. to 75° C. that are the same (i.e., within ±5% (in some embodiments, within ±4, ±3, or even within ±2)). In some embodiments, the first and second sequential overhead electrical power transmission conductor tension subsections have the same length, while in other embodiments, the lengths are different.

"Ruling span" for the overhead electrical power transmission line tension section is defined by the following equation:

$$\text{ruling span} = \sqrt{\frac{\sum_{\text{\# of spans}} \text{span}^3}{\sum_{\text{\# of spans}} \text{span}}}$$

Figure 1:
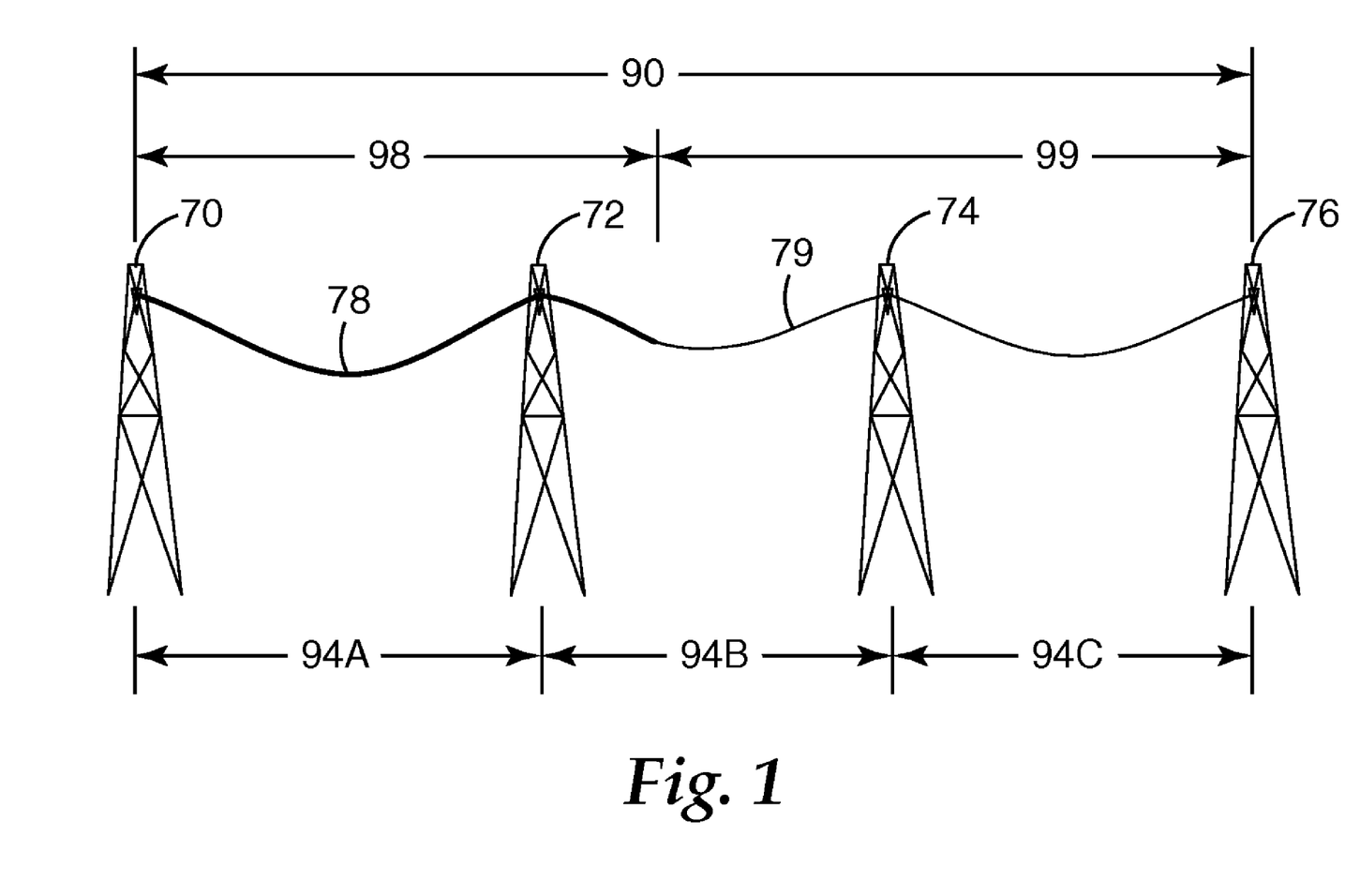
FIG. 1 is an exemplary overhead electrical power transmission line tension section according to the present invention.

An overhead electrical power transmission line can include multiple dead-end towers, multiple tangent (suspension) towers and conductor cable. An overhead electrical power transmission line tension section refers to a portion of the transmission line that extends from one dead-end tower to another dead-end tower. FIG. 1 illustrates exemplary overhead electrical power transmission line tension section 90 having dead-end towers 70 and 76, tangent (suspension) towers 72 and 74, and overhead electrical power conductors 78 and 79. The overhead electrical power transmission conductor tension section refers to the segment of conductor with one end attached to the first dead-end tower and the other end attached to the second dead-end tower of the overhead electrical power transmission line tension section. Overhead electrical power transmission line tension section 90 has spans 94A, 94B, and 94C, and overhead electrical power transmission conductor tension subsections 98 and 99.

In some embodiments, the composite core of the first sequential overhead electrical power transmission conductor tension subsection comprises at least one (in some embodiments, at least 2, 3, 4, 5, 6, 7, 8, 9, 10, 11, 12, 13, 14, 15, 16, 17, 18, 19, 20, 21, 22, 24, 25, 26, 27, 28, 29, 30, 31, 32, 33, 34, 35, 36, 37, 38, 39, 40, 41, 42, 43, 44, 45, 46, 47, 48, 49, or even, at least 50) of a continuous, elongated composite (e.g., wire) or Invar (e.g., wire). In some embodiments, the composite core of the first sequential overhead electrical power transmission conductor tension subsection has a cross-sectional area, wherein the core comprises at least 5 (in some embodiments, 10, 15, 20, 25, 30, 35, 40, 45, 50, 55, 60, 65, 70, 75, 80, 85, 90, 95, or even 100) percent of the core cross-sectional area is composite (e.g., wire(s)) or Invar (e.g., wire(s)). In some embodiments, the core of the first sequential overhead electrical power transmission conductor tension subsection also comprises steel wires, polymeric (e.g., aramid and poly(p-phenylene-2,6-benzobisoxazole)) fibers, ceramic fibers, boron fibers, graphite fibers, carbon fibers, titanium wires, tungsten wires, shape memory alloy wires, and combinations thereof.

In some embodiments, the second sequential overhead electrical power transmission conductor tension subsection comprises a composite core comprising at least one (in some embodiments, at least 2, 3, 4, 5, 6, 7, 8, 9, 10, 11, 12, 13, 14, 15, 16, 17, 18, 19, 20, 21, 22, 24, 25, 26, 27, 28, 29, 30, 31, 32, 33, 34, 35, 36, 37, 38, 39, 40, 41, 42, 43, 44, 45, 46, 47, 48, 49, or even, at least 50) of continuous, elongated composite (e.g., wire) or Invar (e.g., wire). In some embodiments, the second sequential overhead electrical power transmission conductor tension subsection comprises a composite core having a cross-sectional area, wherein at least 5 (in some embodiments, 10, 15, 20, 25, 30, 35, 40, 45, 50, 55, 60, 65, 70, 75, 80, 85, 90, 95, or even 100) percent of the core cross-sectional area is at least one composite (e.g., wire(s)) or Invar (e.g., wire(s)). In some embodiments, the core of the second sequential overhead electrical power transmission conductor tension subsection also comprises steel wires, polymeric (e.g., aramid and poly(p-phenylene-2,6-benzobisoxazole)) fibers, ceramic fibers, boron fibers, graphite fibers, titanium wires, tungsten wires, shape memory alloy wires, and combinations thereof.

In some embodiments, the second sequential overhead electrical power transmission conductor tension subsection is free of composite, and has a core comprising steel wires, polymeric (e.g., aramid and poly(p-phenylene-2,6-benzobisoxazole)) fibers, ceramic fibers, boron fibers, graphite fibers, carbon fibers, titanium wires, tungsten wires, shape memory alloy wires, and combinations thereof. In some embodiments, the core of this second sequential overhead electrical power transmission conductor tension subsection comprises at least one (in some embodiments, at least 2, 3, 4, 5, 6, 7, 8, 9, 10, 11, 12, 13, 14, 15, 16, 17, 18, 19, 20, 21, 22, 24, 25, 26, 27, 28, 29, 30, 31, 32, 33, 34, 35, 36, 37, 38, 39, 40, 41, 42, 43, 44, 45, 46, 47, 48, 49, or even, at least 50) steel wires, polymeric (e.g., aramid and poly(p-phenylene-2,6-benzobisoxazole)) fibers, ceramic fibers, boron fibers, graphite fibers, carbon fibers, titanium wires, tungsten wires, shape memory alloy wires, and combinations thereof. In some embodiments, the core of this second sequential overhead electrical power transmission conductor tension subsection has a cross-sectional area, wherein at least 5 (in some embodiments, 10, 15, 20, 25, 30, 35, 40, 45, 50, 55, 60, 65, 70, 75, 80, 85, 90, 95, or even 100) percent of the core cross-sectional area is steel wires, polymeric (e.g., aramid and poly(p-phenylene-2,6-benzobisoxazole)) fibers, ceramic fibers, boron fibers, graphite fibers, carbon fibers, titanium wires, tungsten wires, shape memory alloy wires, and combinations thereof.

In some embodiments, the dead-end-to-dead-end overhead electrical power transmission conductor according to the present invention further comprises at least one additional (in some embodiments, at least 2, 3, 4, 5, 6, 7, 8, 9, 10, 20, 30, 40, 50, 60, 70, 80, 90, 100 or even more) overhead electrical power transmission conductor tension subsections. In some embodiments, the additional overhead electrical power transmission conductor tension subsection(s) can be independently, a composite core comprising at least one (in some embodiments, at least 2, 3, 4, 5, 6, 7, 8, 9, 10, 11, 12, 13, 14, 15, 16, 17, 18, 19, 20, 21, 22, 24, 25, 26, 27, 28, 29, 30, 31, 32, 33, 34, 35, 36, 37, 38, 39, 40, 41, 42, 43, 44, 45, 46, 47, 48, 49, or even, at least 50) elongated composite (e.g., wire). In some embodiments, the additional overhead electrical power transmission conductor tension subsection(s) can be independently, a composite core comprising at least 5 (in some embodiments, 10, 15, 20, 25, 30, 35, 40, 45, 50, 55, 60, 65, 70, 75, 80, 85, 90, 95, or even 100) percent of the cross-sectional area of the core is composite (e.g., wire(s)), or a core free of composite and comprising steel wires, Invar (e.g., wire(s)), polymer (e.g., aramid and poly(p-phenylene-2,6-benzobisoxazole)) fibers, ceramic fibers, boron fibers, graphite fibers, carbon fibers, titanium wires, tungsten wires, shape memory alloy wires, and combinations thereof, wherein, at temperature in the range from 20° C. to 75° C. (in some embodiments, in a range from 25° C. to 75° C., 20° C. to 100° C., 25° C. to 100° C., 20° C. to 125° C., 25° C. to 125° C., 20° C. to 150° C., 25° C. to 150° C., 20° C. to 175° C., 25° C. to 175° C., 20° C. to 200° C., 25° C. to 200° C., 20° C. to 225° C., 25° C. to 225° C., 20° C. to 240° C., 25° C. to 240° C., 0° C. to 75° C., 0° C. to 100° C., 0° C. to 200° C., 0° C. to 300° C., –40° C. to 100° C., –40° C. to 200° C., or even –40° C. to 300° C.), each overhead electrical power transmission conductor tension subsection exhibits a calculated tension, and wherein each calculated tension is essentially the same. In some embodiments, the core(s) of the additional overhead electrical power transmission conductor tension subsection comprising a composite in the core also comprises steel wires, polymeric (e.g., aramid and poly(p-phenylene-2,6-benzobisoxazole)) fibers, ceramic fibers, boron fibers, graphite fibers, carbon fibers, titanium wires, tungsten wires, shape memory alloy wires, and combinations thereof. In some embodiments, the core(s) of the additional overhead electrical power transmission conductor tension subsection(s) is free of composite in the core and comprises at least one of (in some embodiments, at least 2, 3, 4, 5, 6, 7, 8, 9, 10, 11, 12, 13, 14, 15, 16, 17, 18, 19, 20, 21, 22, 24, 25, 26, 27, 28, 29, 30, 31, 32, 33, 34, 35, 36, 37, 38, 39, 40, 41, 42, 43, 44, 45, 46, 47, 48, 49, or even, at least 50) steel wires, polymer material (e.g., aramid and poly(p-phenylene-2,6-benzobisoxazole)) fibers, ceramic fibers, boron fibers, graphite fibers, carbon fibers, titanium wires, tungsten wires, shape memory alloy wires, and combinations thereof. In some embodiments, at least 5 (in some embodiments, 10, 15, 20, 25, 30, 35, 40, 45, 50, 55, 60, 65, 70, 75, 80, 85, 90, 95, or even 100) percent of the cross-sectional area of the additional tension subsection core is steel wires, polymer (e.g., aramid and poly(p-phenylene-2, 6-benzobisoxazole)) fibers, ceramic fibers, boron fibers, graphite fibers, carbon fibers, titanium wires, tungsten wires, shape memory alloy wires, and combinations thereof.

Overhead electrical power transmission conductors consisting of aluminum matrix composite cores, for example, are typically desirable for use in overhead electrical power transmission lines because they offer more ampacity than overhead electrical power transmission conductors consisting of, for example, steel core conductors, as well as reduced sag given the same cross section area as steel core conductors. As a result, overhead electrical power transmission conductors consisting of aluminum matrix composite cores can be used to increase clearance under an overhead power transmission line and/or operate at higher temperature, and thus carry more current. However, since overhead electrical power transmission conductors consisting of aluminum matrix composite cores are typically more expensive than overhead electrical power transmission conductors consisting of steel cores, it may be desirable to use overhead electrical power transmission conductors consisting of aluminum matrix composite cores only on the portions of an overhead electrical power transmission line tension section that require less sag to maintain the minimum clearance.

DETAILED DESCRIPTION

Surprisingly, it has been discovered that different overhead electrical power transmission tension subsections can be designed, and then made according to techniques known in the art for making overhead electrical power transmission line tension sections with composite (e.g., aluminum matrix composite and polymeric composite) cores, steel cores, etc. such that the different overhead electrical power transmission tension subsections installed in the overhead electrical power transmission line tension section, have calculated tensions that are essentially the same over at least a temperature range from 20° C. to 75° C.

In one exemplary embodiment, each of the overhead electrical power transmission tension subsections utilized in the practice of the present invention are at least about 1250 feet (about 400 meters) in length, although other lengths are contemplated. In some embodiments, each of overhead electrical power transmission tension subsections are at least about 30, 60, 90, 120, 150, 180, 210, 240, 270, 300, 600, 900, 1000, 1200, 1500, 1800, 2100, 2400, 2700 3,000, 5,000, 10,000, 15,000, 20,000, or even at least about 25,000 meters in length.

Exemplary overhead electrical power transmission conductors for overhead electrical power transmission conductor tension subsections include overhead electrical power transmission conductor having cores comprising at least one of a composite (e.g., aluminum matrix composite and polymeric composite) or Invar wire(s), overhead electrical power transmission tension subsections having cores comprising a steel wire(s), polymeric (e.g., aramid and poly(p-phenylene-2,6-benzobisoxazole)) material (e.g., polymeric wires), ceramic, boron, graphite, carbon, titanium (e.g., wires), tungsten (e.g., wires), and/or shape memory alloy (e.g., wires), and combinations thereof. Typically, aluminum wires, copper wires, aluminum alloy wires, and/or copper alloy wires are stranded around the cores. A conductor having an aluminum matrix composite core is sometimes referred to as aluminum conductor composite reinforced ("ACCR").

Other exemplary overhead electrical power transmission conductors for overhead electrical power transmission conductor tension subsections include: aluminum conductor steel reinforced (ACSR), thermal-resistant aluminum alloy conductor steel reinforced (TACSR), ultra thermal-resistant aluminum alloy conductor steel reinforced (ZTACSR), ultra thermal-resistant aluminum alloy conductor Invar reinforced (ZTACIR), heat resistant aluminum alloys (ZTAL), ultra thermal-resistant aluminum alloy conductor steel reinforced (ZTACSR), extra thermal-resistant aluminum alloy conductor steel reinforced (XTACSR), extra thermal-resistant aluminum alloy conductor Invar reinforced (XTACIR), gap type ultra thermal resistant aluminum alloy steel reinforced (GZ-TACSR), high strength thermal resistant aluminum alloy conductor steel reinforced (KTACSR), all aluminum conductor (AAC), all aluminum alloy conductor (AAAC), aluminum conductor composite core (ACCC), and aluminum conductor steel supported (ACSS).

Wires for stranding around a core to provide a conductor utilized in the practice of the present invention are known in the art. Aluminum wires are commercially available, for example, from Nexans, Weyburn, Canada or Southwire Company, Carrollton, Ga. under the trade designations "1350-H19 ALUMINUM" and "1350-H0 ALUMINUM". Typically, aluminum wire have a thermal expansion coefficient in a range from about $20\times10^{-6}/°$ C. to about $25\times10^{-6}/°$ C. over at least a temperature range from about 20° C. to about 500° C. In some embodiments, aluminum wires (e.g., "1350-H19 ALUMINUM") have a tensile breaking strength of at least 138 MPa (20 ksi), 158 MPa (23 ksi), 172 MPa (25 ksi) at least 186 MPa (27 ksi), or even at least 200 MPa (29 ksi.). In some embodiments, aluminum wires (e.g., "1350-H0 ALUMINUM") have a tensile breaking strength greater than 41 MPa (6 ksi) to no greater than 97 MPa (14 ksi), or even no greater than 83 MPa (12 ksi). Aluminum alloy wires are commercially available, for example, from Sumitomo Electric Industries, Osaka, Japan under the trade designation "ZTAL", or Southwire Company, Carrollton, Ga., under the designation "6201". In some embodiments, aluminum alloy wires have a thermal expansion coefficient in a range from about $20\times10^{-6}/°$ C. to about $25\times10^{-6}/°$ C. over at least a temperature range from about 20° C. to about 500° C. Copper wires are commercially available, for example, from Southwire Company, Carrollton, Ga. Typically, copper wires have a thermal expansion coefficient in a range from about $12\times10^{-6}/°$ C. to about $18\times10^{-6}/°$ C. over at least a temperature range from about 20° C. to about 800° C. Copper alloy (e.g., copper bronzes such as Cu—Si—X, Cu—Al—X, Cu—Sn—X, Cu—Cd; where X=Fe, Mn, Zn, Sn, and/or Si; commercially available, for example, from Southwire Company, Carrollton, Ga.; oxide dispersion strengthened copper available, for example, from OMG Americas Corporation, Research Triangle Park, N.C., under the designation "GLIDCOP") wires. In some embodiments, copper alloy wires have a thermal expansion coefficient in a range from about $10\times10^{-6}/°$ C. to about $25\times10^{-6}/°$ C. over at least a temperature range from about 20° C. to about 800° C. The wires may be in any of a variety shapes (e.g., circular, elliptical, and trapezoidal).

Suitable overhead electrical power transmission conductors for overhead electrical power transmission conductor tension subsections having cores comprising an aluminum matrix composite wire(s) can be made by techniques known in the art. Examples of suitable continuous (i.e., having a length that is relatively infinite when compared to the average fiber diameter) ceramic fibers for the cores of the ACCR overhead electrical power transmission conductors include glass, silicon carbide fibers, and ceramic oxide fibers. Typically, the ceramic fibers are crystalline ceramics (i.e., exhibits a discernible X-ray powder diffraction pattern) and/or a mixture of crystalline ceramic and glass (i.e., a fiber may contain both crystalline ceramic and glass phases), although they may also be glass. In some embodiments, the fiber is at least 50 (in some embodiments, at least 55, 60, 65, 70, 75, 80, 85, 90, 95, 96, 97, 98, 99, or even 100) percent by weight crystalline. Examples of suitable crystalline ceramic oxide fibers include refractory fibers such as alumina fibers, aluminosilicate fibers, aluminoborate fibers, aluminoborosilicate fibers, zirconia-silica fibers, and combinations thereof.

In some embodiments of the cores of the ACCR overhead electrical power transmission conductors, it is desirable for the fibers to comprise at least 40 (in some embodiments, at least 50, 60, 65, 70, 75, 80, 85, 90, 95, 96, 97, 98, 99, or even 100) percent by volume $Al_2O_3$, based on the total volume of the fiber. In some embodiments, it is desirable for the fibers to comprise in a range from 40 to 70 (in some embodiments, in a range from 55 to 70, or even 55 to 65) percent by volume $Al_2O_3$, based on the total volume of the fiber.

Further, exemplary glass fibers are available, for example, from Corning Glass, Corning, N.Y. Typically, the continuous glass fibers have an average fiber diameter in a range from about 3 micrometers to about 19 micrometers. In some embodiments, the glass fibers have an average tensile strength of at least 3 GPa, 4 GPa, and or even at least 5 GPa. In some embodiments, the glass fibers have a modulus in a range from about 60 GPa to 95 GPa, or about 60 GPa to about 90 GPa.

Alumina fibers are described, for example, in U.S. Pat. Nos. 4,954,462 (Wood et al.) and 5,185,299 (Wood et al.). In some embodiments, the alumina fibers are polycrystalline alpha alumina fibers, and comprise, on a theoretical oxide basis, greater than 99 percent by weight $Al_2O_3$ and 0.2-0.5 percent by weight $SiO_2$, based on the total weight of the alumina fibers. In another aspect, some desirable polycrystalline, alpha alumina fibers comprise alpha alumina having an average grain size of less than 1 micrometer (or even, in some embodiments, less than 0.5 micrometer). In another aspect, in some embodiments, polycrystalline, alpha alumina fibers have an average tensile strength of at least 1.6 GPa (in some embodiments, at least 2.1 GPa, or even, at least 2.8 GPa), as determined according to the tensile strength test described in U.S. Pat. No. 6,460,597 (McCullough et al.). Exemplary alpha alumina fibers are marketed under the trade designation "NEXTEL 610" by 3M Company, St. Paul, Minn.

Aluminosilicate fibers are described, for example, in U.S. Pat. No. 4,047,965 (Karst et al.). Exemplary aluminosilicate fibers are marketed under the trade designations "NEXTEL 440", "NEXTEL 550", and "NEXTEL 720" by 3M Company.

Aluminumborate and aluminoborosilicate fibers are described, for example, in U.S. Pat. No. 3,795,524 (Sowman). Exemplary aluminoborosilicate fibers are marketed under the trade designation "NEXTEL 312" by 3M Company.

Zirconia-silica fibers are described, for example, in U.S. Pat. No. 3,709,706 (Sowman).

Typically, the continuous ceramic fibers have an average fiber diameter of at least about 5 micrometers, more typically, in a range from about 5 micrometers to about 20 micrometers; and in some embodiments, in a range from about 5 micrometers to about 15 micrometers.

Typically, the ceramic fibers are in tows. Tows are known in the fiber art and typically include a plurality of (individual) generally untwisted fibers (typically at least 100 fibers, more typically at least 400 fibers). In some embodiments, tows comprise at least 780 individual fibers per tow, and in some cases, at least 2600 individual fibers per tow, or at least 5200 individual fibers per tow. Tows of various ceramic fibers are available in a variety of lengths, including 300 meters, 500 meters, 750 meters, 1000 meters, 1500 meters, and longer. The fibers may have a cross-sectional shape that is circular, elliptical, or dogbone.

Exemplary boron fibers are commercially available, for example, from Textron Specialty Fibers, Inc. of Lowell, Mass. Typically, such fibers have a length on the order of at least 50 meters, and may even have lengths on the order of kilometers or more. Typically, the continuous boron fibers have an average fiber diameter in a range from about 80 micrometers to about 200 micrometers. More typically, the average fiber diameter is no greater than 150 micrometers, most typically in a range from 95 micrometers to 145 micrometers. In some embodiments, the boron fibers have an average tensile strength of at least 3 GPa, and or even at least 3.5 GPa. In some embodiments, the boron fibers have a modulus in a range from about 350 GPa to about 450 GPa, or even in a range from about 350 GPa to about 400 GPa.

Further, exemplary silicon carbide fibers are marketed, for example, by COI Ceramics of San Diego, Calif. under the trade designation "NICALON" in tows of 500 fibers, from Ube Industries of Japan, under the trade designation "TYRANNO", and from Dow Corning of Midland, Mich. under the trade designation "SYLRAMIC".

Exemplary silicon carbide monofilament fibers are marketed, for example, by Specialty Materials, Inc., Lowell, Mass. under the trade designation "SCS-9", "SCS-6", and "Ultra-SCS".

Exemplary aluminum metals for matrix are highly pure (e.g., greater than 99.95%) elemental aluminum or alloys of pure aluminum with other elements, such as copper. Typically, the aluminum matrix material is selected such that the matrix material does not significantly chemically react with the fiber (i.e., is relatively chemically inert with respect to fiber material), for example, to eliminate the need to provide a protective coating on the fiber exterior.

In some embodiments, the aluminum matrix comprises at least 98 percent by weight aluminum, at least 99 percent by weight aluminum, greater than 99.9 percent by weight aluminum, or even greater than 99.95 percent by weight aluminum. Exemplary aluminum alloys of aluminum and copper comprise at least 98 percent by weight aluminum and up to 2 percent by weight copper. In some embodiments, useful aluminum alloys are 1000, 2000, 3000, 4000, 5000, 6000, 7000 and/or 8000 series aluminum alloys (Aluminum Association designations). Although higher purity aluminum tends to be desirable for making higher tensile strength wires, less pure forms of metals are also useful.

Suitable aluminum is available, for example, under the trade designation "SUPER PURE ALUMINUM; 99.99% Al" from Alcoa, Pittsburgh, Pa. Aluminum alloys (e.g., Al-2% by weight Cu (0.03% by weight impurities)) can be obtained, for example, from Belmont Metals, New York, N.Y.

The composite cores and wires typically comprise at least 15 percent by volume (in some embodiments, at least 20, 25, 30, 35, 40, 45, or even 50 percent by volume) of the fibers, based on the total combined volume of the fibers and aluminum matrix material. More typically the composite cores and wires comprise in the range from 40 to 75 (in some embodiments, 45 to 70) percent by volume of the fibers, based on the total combined volume of the fibers and aluminum matrix material.

Typically the average diameter of the core is in a range from about 3 mm to about 40 mm. In some embodiments, the average diameter of core desirable is at least 10 mm, at least 15 mm, 20 mm, or even up to about 25 mm (e.g., 10 mm to 30 mm). Typically the average diameter of the composite wire is in a range from about 1 mm to 12 mm, 1 mm to 10 mm, 1 to 8 mm, or even 1 mm to 4 mm. In some embodiments, the average diameter of composite wire desirable is at least 1 mm, at least 1.5 mm, 2 mm, 3 mm, 4 mm, 5 mm, 6 mm, 7 mm, 8 mm, 9 mm, 10 mm, 11 mm, or even at least 12 mm.

Techniques for making aluminum composite wires are known in the art. For example, continuous metal matrix composite wire can be made by continuous metal matrix infiltration processes. One suitable process is described, for example, in U.S. Pat. No. 6,485,796 (Carpenter et al.), the disclosure of which is incorporated herein by reference. Other processing routes for continuous fiber reinforced metal matrix composites are, for example, discussed in ASM Handbook Vol. 21, Composites, pp. 584-588 (ASM International, Metals Park, Ohio), published in 2001, the disclosure of which is incorporated herein by reference.

Overhead electrical power transmission conductors having cores comprising a steel wire(s) are commercially available, for example, from Southwire, Carrollton, Ga. Typically, the steel wires of the core are a medium to high strength steel with a nominal tensile strength range of 1172 MPa (170 ksi) to 1931 MPa (280 ksi), and usually are coated to impart good corrosion resistance. Common coating materials include zinc (also known as galvanized) or zinc alloy with 5% aluminum-mischmetal. Additional types of coatings are aluminum or aluminum cladding, for example, aluminum clad steel (e.g., "ALUMOWELD", available from Alumoweld, Duncan, S.C.) such as Wires AWG #4 (with nominal diameter of 0.2043 inch (5.18 mm) ultimate tensile strength 115 ksi (109 kg/mm$^2$) weight of 93.63 lbs/1000 ft (139.3 kg/km) and a resistance of 1.222 ohms/1000 ft at 68° F. (4.009 ohms/km at 20° C.)), Wires AWG #8 (with nominal diameter of 0.1285 inch (3.264 mm) ultimate tensile strength 195 ksi (137 kg/mm$^2$) weight of 37.03 lbs/1000 ft (55.11 kg/km) and a resistance of 3.089 ohms/1000 ft at 68° F. (10.13 ohms/km at 20° C.)).

Polymeric core conductors such as composite fiber glass/carbon fiber core are available, for example, from Composite Technology Corporation, Irvine, Calif., under the trade designation "ACCC/TW DRAKE". Polymeric composites reinforced with carbon fiber are available, for example, from Tokyo Rope, Japan. Aluminum wires reinforced with silicon carbide fibers are available, for example, from Nippon Carbon, Japan. Aluminum wires reinforced with graphite fibers are available, for example, from Yazaki Corp., Japan.

In some embodiments, the coefficients of thermal expansion of overhead electrical power transmission conductor tension subsections are in a range from zero to $25 \times 10^{-6}/°$ C. (in some embodiments, in a range from $8 \times 10^{-6}/°$ C. to $20 \times 10^{-6}/°$ C., or even $14 \times 10^{-6}/°$ C. to $20 \times 10^{-6}/°$ C.). In some embodiments, the densities of electrical power transmission conductor tension subsections are in a range from 1.4 g/cm$^3$ to 20 g/cm$^3$ (in some embodiments, in a range from 16 g/cm$^3$ to 19 g/cm$^3$, 2.7 g/cm$^3$ to 3.6 g/cm$^3$, or 2.2 g/cm$^3$ to 4.5 g/cm$^3$).

Conductors utilized in the present invention are typically stranded. A stranded conductor typically includes a central wire and a first layer of wires helically stranded around the central wire. Conductor stranding is a process in which individual strands of wire are combined in a helical arrangement to produce a finished conductor (see, e.g., U.S. Pat. Nos. 5,171,942 (Powers) and 5,554,826 (Gentry)). The resulting helically stranded wire rope provides far greater flexibility than would be available from a solid rod of equivalent cross sectional area. The helical arrangement is also beneficial because the stranded conductor maintains its overall round cross-sectional shape when the conductor is subject to bending in handling, installation, and use. Helically-stranded conductors may include as few as 7 individual strands to more common constructions containing 50 or more strands.

Figure 4:
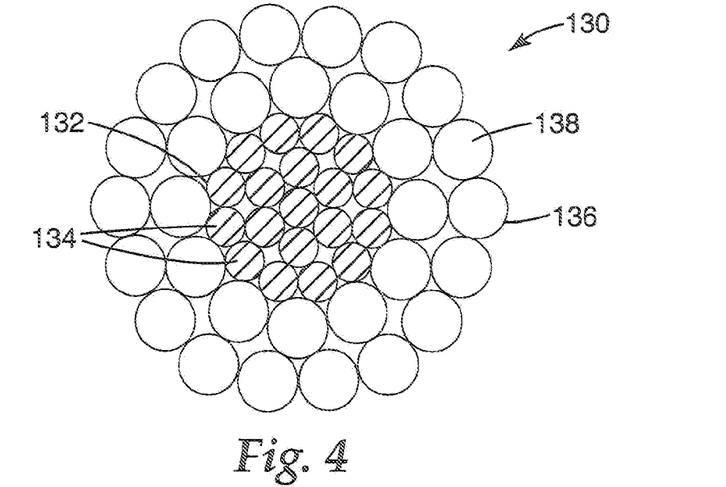
FIGS. 4 and 5 are schematic, cross-sections of two exemplary embodiments of overhead electrical power transmission line with conductors having cores of composite wires.

One exemplary overhead electrical power transmission conductor useful in the present invention is shown in FIG. 4, where overhead electrical power transmission conductor 130 may be core 132 of nineteen individual wires (e.g., composite (e.g., metal matrix composite) wires) 134 surrounded by ring 136 of thirty individual metal wires (e.g., aluminum or aluminum alloy wires) 138. Likewise, as shown in FIG. 5, as one of many alternatives, overhead electrical power transmission conductor 140 may be core 142 of thirty-seven individual wires (e.g., composite (e.g., metal matrix composite) wires) 144 surrounded by jacket 146 of twenty-one individual metal (e.g., aluminum or aluminum alloy) wires 148.

Figures 5, 6:
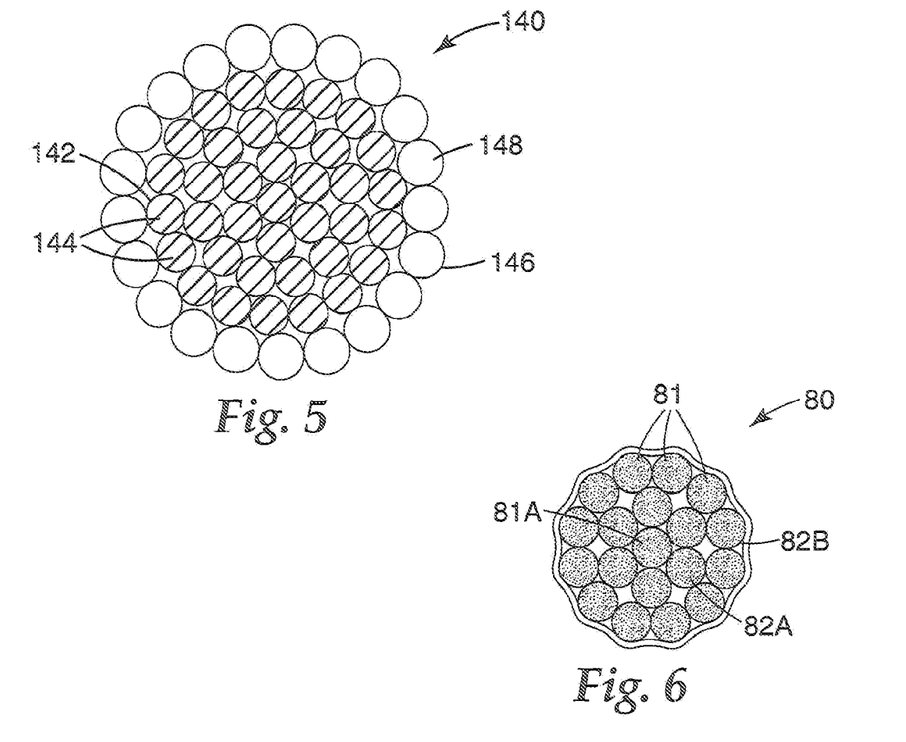
FIG. 6 is an end view of an exemplary embodiment of a stranded conductor with a maintaining means around the plurality of strands.

FIG. 6 illustrates yet another exemplary embodiment of stranded conductor 80. In this embodiment, the stranded conductor includes central wires (e.g., composite (e.g., metal matrix composite) wires) 81A and first layer 82A of composite wires (e.g., metal matrix composite) that have been helically stranded about the core central composite wire (e.g., metal matrix composite) 81A. This embodiment further includes a second layer 82B of composite (e.g., metal matrix composite) wires 81 that have been helically stranded about first layer 82A. Any suitable number of composite wires (e.g., metal matrix composite) 81 may be included in any layer. Furthermore, more than two layers may be included in stranded conductor 80 if desired.

Additional details for making aluminum matrix composite wires and conductors include those discussed, for example, in U.S. Pat. Nos. 5,501,906 (Deve), 6,180,232 (McCullough et al.), 6,245,425 (McCullough et al.), 6,336,495 (McCullough et al.), 6,544,645 (McCullough et al.), 6,447,927 (McCullough et al.), 6,460,597 (McCullough et al.), 6,329,056 (Deve et al.), 6,344,270 (McCullough et al.), 6,485,796 (Carpenter et al.), 6,559,385 (Johnson et al.), 6,796,365 (McCullough et al.), 6,723,451 (McCullough et al.) 6,692,842 (McCullough et al.), 6,913,838 (McCullough et al.), 7,093,416 (Johnson et al.); 7,297,238 (Nayar et al.), and 7,131,308 (McCullough et al.), U.S. Patent Application Publication 2005/0181228 A1, U.S. Patent Application Publication 2006/0102377 A1, U.S. Patent Application Publication 2006/0102378 A1, U.S. application having Ser. No. 60/755,690, filed Jan. 30, 2005, and U.S. Pat. No. 7,353,602 (McCullough et al.), the disclosures of which are incorporated herein by reference for their teachings on making and using metal matrix composite wires and conductors comprising the same. Aluminum matrix composite containing conductors are also available, for example, from 3M Company under the trade designation "795 kcmil ACCR".

A number of accessories are known in the art and used to facilitate the connection of conductor sections, and attaching the conductor to the towers. For example, terminations (also called "dead-ends") and joints (also called "mid-span splices" or full-tension splices/joints) are commercially available, for example, from Alcoa Conductor Accessories (ACA), Spartanburg, S.C. and Preformed Line Products (PLP), Cleveland, Ohio. Although the specific construction of the conductors will depend on the desired characteristics of the overall overhead electrical power transmission line tension section, typically, the dead-end accessories connect the conductor to the towers.

Figure 2:
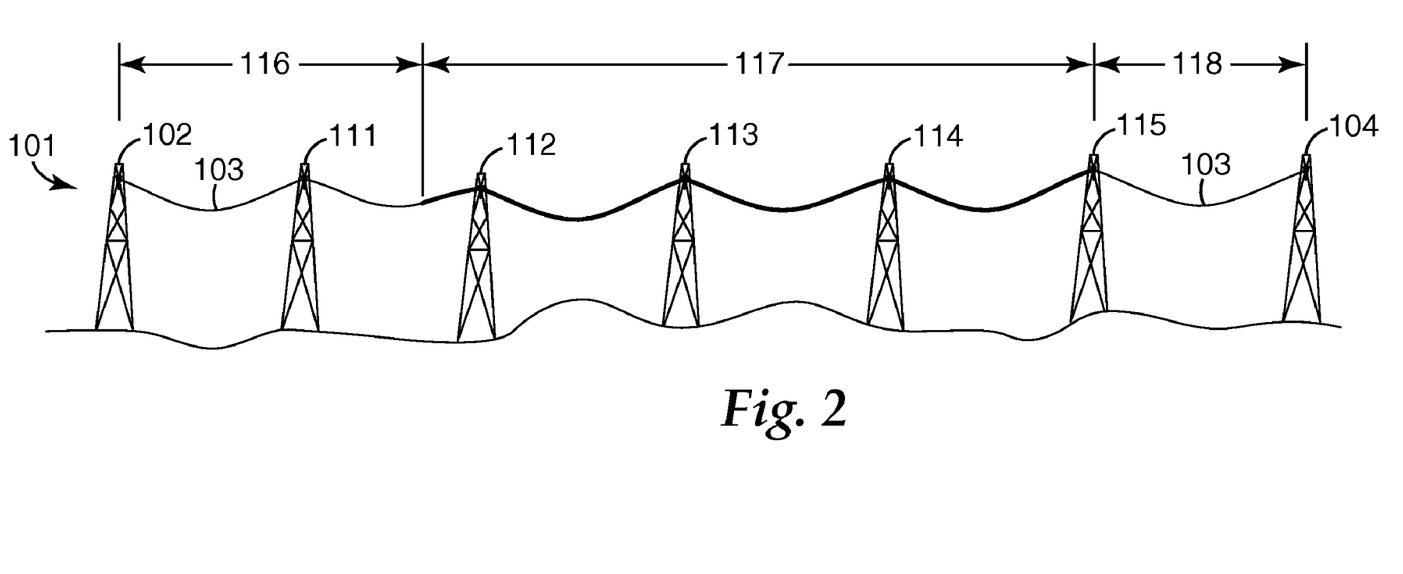
FIGS. 2 and 3 are schematics of exemplary dead-end-to-dead-end overhead electrical power transmission line tension sections according to the present invention.

Referring to FIG. 2, exemplary dead-end-to-dead-end overhead electrical power transmission conductor 101 according to the present invention comprises dead-end towers 102 and 104, and overhead electrical power transmission conductor 103 secured between dead-end towers 102 and 104, with additional support provided by tangent (suspension) towers 111, 112, 113, 114, and 115. Overhead electrical power transmission conductor 103 has secured together, overhead electrical power transmission conductor tension subsections with steel cores 116 and 118, and overhead electrical power transmission tension conductor subsections with an aluminum matrix composite core 117.

Figure 3:
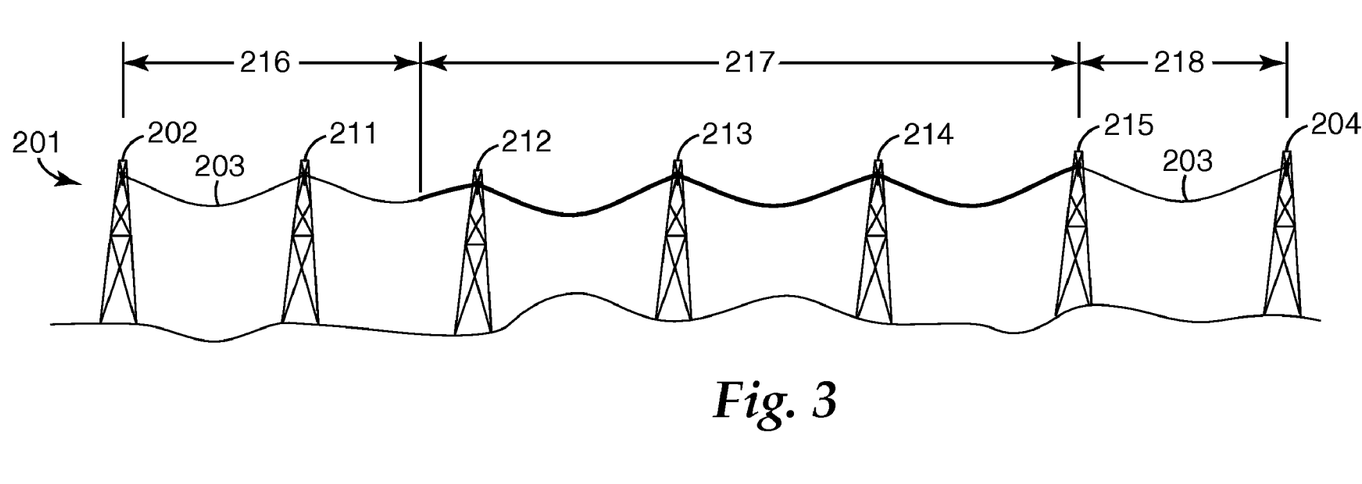

Referring to FIG. 3, another exemplary dead-end-to-dead-end overhead electrical power transmission line tension section 201 according to the present invention comprises dead-end towers 202 and 204, and overhead electrical power transmission conductor 203 secured between dead-end towers 202 and 204, with additional support provided by tangent (suspension) towers 211, 212, 213, 214, and 215. Overhead electrical power transmission conductor 203 has secured together, overhead electrical power transmission conductor tension subsections with aluminum matrix composite cores 216 and 218, and overhead electrical power transmission conductor tension subsections with steel core 217.

The dead-end towers (structures) allow for generally no longitudinal movement of the conductor. In between the dead-end structures, suspension structures support the conductor vertically. The conductor is connected to the suspension tower via an insulator string (typically strung-together insulated ceramic discs). One end of the insulator string is attached to the suspension tower and the other end of the insulator string is attached to the conductor. This latter attachment is referred to as the conductor attachment point. As changes in tension occur in the conductor, the insulator string, pivoting around the suspension tower attachment site, will pull on the conductor and longitudinally move the conductor attachment point to balance the ensuing forces. This movement is referred to as insulator swing. Changes in conductor tension between spans on a suspension tower are normally equalized by insulator swing. The insulator swings from the lower-tension span towards the higher-tension span to equalize the tension between spans. This causes the tension to drop in the higher-tension span increasing sag in that span.

Overhead electrical power transmission line tension sections are also designed to maintain the desired or required clearances at all times. To ensure adequate clearance under all weather and electrical loadings, the sag behavior of the conductor is incorporated into line design. Sag tension calculations are used to predict the sag behavior of the conductor under varying conditions. These sag tension calculations are normally done numerically using different loading conditions and characteristics of the line. One important loading condition is the sag and tension of the conductor at different operating temperatures. As more current is transmitted through a conductor its temperature increases due to "$I^2R$" resistive losses and it elongates due to the thermal expansion of the materials. As the conductor elongates the tension in the span decreases and the conductor's sag increases.

In conventional designs where the same conductor is installed on equal length spans on both sides of the suspension tower, the change in tension will be the same for both conductors and the conductor attachment point will not move. If one span is longer than another, the tension will decrease faster in the short span. The conductor attachment point will then move towards the longer span.

In the case of equal length tension subsections with conductors that have different thermal elongation behaviors, the conductors will elongate at different rates and the conductor tension will change at different rates. Typically, the tension will change more rapidly in the conductor having the greater thermal elongation. Thus, the conductor attachment point would move towards the conductor that expands the least (i.e., the overhead electrical power transmission conductor tension subsection that has the higher tension). If a low expansion conductor is installed on one span and a higher expansion conductor on an adjacent span, one skilled in the art would expect that the movement of the insulator string would cause excessive sag in the conductor with the lower expansion such that it would exceed clearances. Further, one skilled in the art would normally expect that it would not be possible to install different conductors on the same overhead electrical power transmission line tension section without clearance violations. Hence the surprising nature of the present invention.

Additional details on selecting types of conductors, types of materials used for conductors, methods for manufacturing tension subsections, methods of connecting tension subsections, types of overhead power transmission lines, and other related examples may be found in U.S. Patent Application Publications 2008/0162106 A1 and 2008/0156524 A1, the disclosures of which are incorporated herein by reference.

EXAMPLE

The Example was conducted using software to predict outcomes. The first conductor was an aluminum conductor composite reinforced ("ACCR"; available from 3M Company, St. Paul, Minn., under the trade designation "ACCR 795-T16"). The second conductor was an aluminum conductor steel reinforced ("ACSR"; available from Southwire, Carrollton, Ga., under the trade designation "795 DRAKE ACSR"). In this Example both tension subsections are the same length and equal to a span.

The software (and model) used to predict the sag and tension vs. temperature behavior of conductors was obtained from ACA Conductor Accessories, Spartanburg, S.C., under the trade designation "SAG10" (version 3.0 update 3.9.7). The stress parameter was a fitting parameter in the software labeled as the "built-in aluminum stress" which can be altered to fit other parameters if material other than aluminum is used (e.g., aluminum alloy), and which adjusts the position of the knee-point on the predicted graph and also the amount of sag in the high temperature, post-knee-point regime. A description of the stress parameter theory is provided in the Alcoa Sag10 Users Manual (Version 2.0): Theory of Compressive Stress in Aluminum of ACSR, the disclosure of which is incorporated herein by reference.

The following conductor parameters were required for entry into the software ("SAG10"); area, diameter, weight per unit length, and rated breaking strength (RBS). The following line loading conditions were required for entry into the software: span length and initial tension at installation temperature. The following parameters were required for entry into the software to run the compressive stress calculation: built in wire stress, wire area (as fraction of total area), number of wire layers in the conductor, number of wire strands in the conductor, number of core strands, and the stranding lay ratios of each wire layer. Stress-strain coefficients were required for input into the software as a Table (see Tables 4 and 8, below). Also a parameter TREF was specified which is the temperature at which the coefficients are referenced. Sag and tension vs. temperature curves were generated using the software. The conductor parameters shown in Tables 1-8 (below) were entered into the software ("SAG10").

TABLE 1

First Conductor ACCR Conductor Parameters

| | |
|---|---|
| Area | 467 mm$^2$ (0.724 in$^2$) |
| Diameter | 2.81 cm (1.11 in) |
| Weight | 1.33 kg/m (0.896 lbs/ft) |
| RBS: | 14,106 kg (31,100 lbs) |

TABLE 2

Line Loading Conditions for ACCR Conductor

| | |
|---|---|
| Span Length | 381 m (1,250 ft) |
| Initial Tension (at 60° F. (16° C.)) | 2390 kg (5,207 lbs) |

TABLE 3

Options for Compressive Stress Calculation for ACCR Conductor

| | |
|---|---|
| Built in Aluminum Stress Value | 2500 |
| Aluminum Area (as fraction of total area) | 0.8522 |
| Number of Aluminum Layers: | 2 |
| Number of Aluminum Strands | 26 |
| Number of Core Strands | 19 |
| Stranding Lay Ratios | |
| Outer Layer | 11 |
| Inner Layer | 13 |

TABLE 4

Stress Strain Parameters for ACCR Conductor; TREF = 71° F. (22° C.)

Initial Aluminum

| A0 | A1 | A2 | A3 | A4 | AF |
|---|---|---|---|---|---|
| −73 | 53260 | −56747 | 35117 | −17439 | 74602 |

Final Aluminum (10 year creep)

| B0 | B1 | B2 | B3 | B4 | α (Al) |
|---|---|---|---|---|---|
| 0 | 19446 | 12378 | −8047 | 6929 | 0.0128 |

Initial Core

| C0 | C1 | C2 | C3 | C4 | CF |
|---|---|---|---|---|---|
| −0.03 | 49769 | −9492.5 | −14.95 | 14.79 | 48119 |

Final Core (10 year creep)

| D0 | D1 | D2 | D3 | D4 | α (core) |
|---|---|---|---|---|---|
| −0.03 | 49769 | −9492.5 | −14.95 | 14.79 | 0.000353 |

TABLE 5

Second Conductor ACSR Conductor Parameters

| | |
|---|---|
| Area | 468.6 mm² (0.7264 in²) |
| Diameter | 2.81 cm (1.11 in) |
| Weight | 1.628 kg/m (1.094 lb/ft) |
| RBS: | 14,288 kg (31,500 lbs) |

TABLE 6

Line Loading Conditions for ACSR Conductor

| | |
|---|---|
| Span Length | 381 m (1,250 ft) |
| Initial Tension (at 60° F. (16° C.)) | 2390 kg (5,207 lbs) |

TABLE 7

Options for Compressive Stress Calculation for ACSR Conductor

| | |
|---|---|
| Built in Aluminum Stress Value | 2500 |
| Aluminum Area (as fraction of total area) | 0.85999 |
| Number of Aluminum Layers: | 2 |
| Number of Aluminum Strands | 26 |
| Number of Core Strands | 7 |
| Stranding Lay Ratios | |
| Outer Layer | 11 |
| Inner Layer | 13 |

TABLE 8

Stress Strain Parameters for ACSR Conductor; TREF = 70° F. (21° C.)

Initial Aluminum

| A0 | A1 | A2 | A3 | A4 | AF |
|---|---|---|---|---|---|
| −1213 | 44308.1 | −14004.4 | −37618 | 30676 | 64000 |

Final Aluminum (10 year creep)

| B0 | B1 | B2 | B3 | B4 | α (Al) |
|---|---|---|---|---|---|
| −544.8 | 21426.8 | −18842.2 | 5495 | 0 | 0.00128 |

Initial Core

| C0 | C1 | C2 | C3 | C4 | CF |
|---|---|---|---|---|---|
| −69.3 | 38629 | 3998.1 | −45713 | 27892 | 37000 |

Final Core (10 year creep)

| D0 | D1 | D2 | D3 | D4 | α (core) |
|---|---|---|---|---|---|
| 47.1 | 36211.3 | 12201.4 | −72392 | 46338 | 0.00064 |

Figure 7:
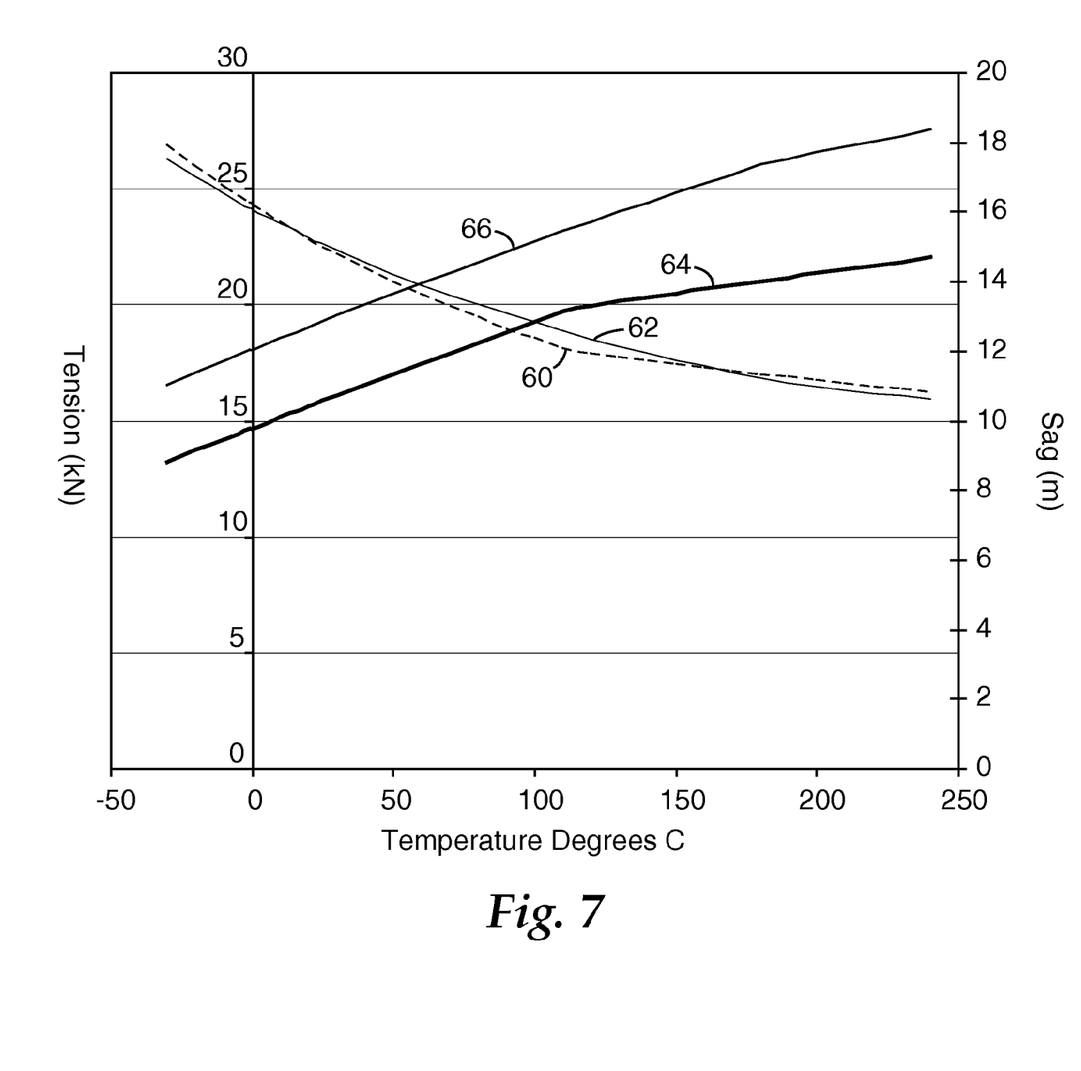
FIG. 7 is a graph of the sag and tension data versus temperature for two different overhead electrical power transmission conductors (overhead electrical power transmission tension subsections) (i.e., ACCR and ACSR), using modeling software described in the Example.

FIG. 7 shows data generated using the software ("SAG10"), wherein the sags and tensions of the ACCR and ACSR conductors are plotted versus conductor temperature. Line 60 shows the tension of the ACCR composite conductor and line 64 the sag of the ACCR conductor. Line 62 shows the tension of the ACSR conductor and line 66 the sag of the ACSR conductor. FIG. 7 shows that the ACCR tension almost perfectly matches the ACSR tension across the temperature range of −30° C. to 240° C. Although the tension is equivalent in both conductor spans, the sag is lower in the ACCR span across that same temperature range. The Example is for equivalent tension subsection lengths on both sides of the suspension tower and no differences in elevation. The value for the compressive stress parameter for the Example was 17.2 MPa (2500 psi).

To highlight further, in the Example at 15° C. both conductors had the same tension, however, the ACCR conductor had less sag (2 meters (6.5 feet)) than the ACSR conductor. This would allow the ACCR conductor to be installed on spans where less sag is required.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A dead-end-to-dead-end overhead electrical power transmission line tension section comprising: first and second dead-end towers; and an overhead electrical power transmission conductor tension section having a first end attached to the first dead-end tower and a second end attached to the second dead-end tower, and being comprised of at least a first and a second sequential overhead electrical power transmission conductor tension subsection, wherein at least the first sequential overhead electrical power transmission conductor tension subsection has at least one of a composite core or an INVAR core, wherein the first and second overhead electrical power transmission conductor tension subsections each have a sag value, wherein the first overhead electrical power transmission conductor tension subsection has a first coefficient of thermal expansion and a first density, wherein the second overhead electrical power transmission conductor tension subsection has a second coefficient of thermal expansion and a second density, wherein at least one of the first and second coefficients of thermal expansion or the first and second densities, at temperatures in the range from 20° C. to 75° C., are different, wherein the first and second overhead electrical power transmission conductor tension subsections each have a cross-sectional area, and wherein the cross-sectional areas are the same, and wherein the first and second overhead electrical power transmission conductor tension subsections each independently have calculated tensions over a range from 20° C. to 75° C. that are the same.

2. The dead-end-to-dead-end overhead electrical power transmission line tension section according to claim 1, wherein the first sequential overhead electrical power transmission conductor tension subsection comprises the composite core.

3. The dead-end-to-dead-end overhead electrical power transmission line tension section according to claim 2, wherein the composite core comprises at least one of an aluminum or aluminum alloy matrix composite.

4. The dead-end-to-dead-end overhead electrical power transmission line tension section according to claim 2, wherein the composite core comprises polymeric matrix composite.

5. The dead-end-to-dead-end overhead electrical power transmission line tension section according to claim 2, wherein the first and second coefficients of thermal expansion are in a range from zero to $25 \times 10^{-6}/°$ C.

6. The dead-end-to-dead-end overhead electrical power transmission line tension section according to claim 2, wherein the first and second densities are in a range from 1.4 g/cm$^3$ to 20 g/cm$^3$.

7. The dead-end-to-dead-end overhead electrical power transmission line tension section according to claim 2, wherein the first and second coefficients of thermal expansion are in a range from zero to $25 \times 10^{-6}/°$ C., and wherein the first and second densities are in a range from 1.4 g/cm$^3$ to 20 g/cm$^3$.

8. The dead-end-to-dead-end overhead electrical power transmission line tension section according to claim 2, wherein the first and second densities are in a range from 2.7 g/cm$^3$ to 3.6 g/cm$^3$.

9. The dead-end-to-dead-end overhead electrical power transmission line tension section according to claim 2, wherein the first and second densities are in a range from 2.2 g/cm$^3$ to 4.5 g/cm$^3$.

10. The dead-end-to-dead-end overhead electrical power transmission line tension section according to claim 2, wherein the second sequential overhead electrical power transmission conductor section has a steel core.

11. The dead-end-to-dead-end overhead electrical power transmission line tension section according to claim 2, wherein the second sequential overhead electrical power transmission conductor tension subsection has a core having a cross-sectional area, wherein at least 50 percent of the cross-sectional area of the core is aluminum matrix composite wire.

12. The dead-end-to-dead-end overhead electrical power transmission line tension section according to claim 2, wherein the second sequential overhead electrical power transmission conductor tension subsection has an aluminum matrix composite core.

13. The dead-end-to-dead-end overhead electrical power transmission line tension section according to claim 2, further comprising at least one additional overhead electrical power transmission conductor tension subsection having a composite core, wherein, at temperature in the range from 20° C. to 75° C., the first overhead electrical power transmission conductor tension subsection, the second overhead electrical power transmission conductor tension subsection, and the additional overhead electrical power transmission conductor tension subsection each independently have calculated tensions over a range from 20° C. to 75° C. that are the same 14. The dead-end-to-dead-end overhead electrical power transmission line tension section according to claim 13, further comprising at least three tangent towers positioned between the first and second dead-end towers.

15. The dead-end-to-dead-end overhead electrical power transmission line tension section according to claim 2, further comprising at least one additional overhead electrical power transmission conductor tension subsection having an aluminum matrix composite core, wherein, at temperature in the range from 20° C. to 75° C., the first overhead electrical power transmission conductor tension subsection, the second overhead electrical power transmission conductor tension subsection, and the additional overhead electrical power transmission conductor tension subsection each independently have calculated tensions over a range from 20° C. to 75° C. that are the same.

16. The dead-end-to-dead-end overhead electrical power transmission line tension section according to claim 15, further comprising at least three tangent towers positioned between the first and second dead-end towers.

17. The dead-end-to-dead-end overhead electrical power transmission line tension section according to claim 15, wherein the additional overhead electrical power transmission conductor tension subsection has an aluminum matrix composite core.

* * * * *